United States Patent
Huang

(10) Patent No.: US 6,732,642 B1
(45) Date of Patent: May 11, 2004

(54) AUTO SCREEN-PRINTING METHOD FOR USE IN IMR AND INJECTION-MOLDING

(75) Inventor: Jui Peng Huang, Taipei County (TW)

(73) Assignee: Taiyi Precision Tech Corp., Taipei County (TW)

( * ) Notice: Subject to any disclaimer, the term of this patent is extended or adjusted under 35 U.S.C. 154(b) by 0 days.

(21) Appl. No.: 10/412,094

(22) Filed: Apr. 9, 2003

(51) Int. Cl.7 .................................................. B41M 1/12
(52) U.S. Cl. ..................................... 101/129; 101/424.1
(58) Field of Search ......................... 101/35, 129, 211, 101/483, 488, 424.1

(56) References Cited

U.S. PATENT DOCUMENTS

| | | | | |
|---|---|---|---|---|
| 5,616,450 A | * | 4/1997 | Arai et al. ................... | 430/321 |
| 6,001,292 A | * | 12/1999 | Atake .......................... | 264/135 |
| 6,244,183 B1 | * | 6/2001 | Haney et al. ................ | 101/490 |
| 6,308,034 B1 | * | 10/2001 | Nakashima et al. ......... | 399/249 |
| 6,634,291 B2 | * | 10/2003 | Huang ......................... | 101/129 |
| 2002/0015809 A1 | * | 2/2002 | Rantala et al. ............... | 428/29 |

* cited by examiner

Primary Examiner—Ren Yan
(74) Attorney, Agent, or Firm—Pro-Techtor International Services

(57) ABSTRACT

An auto screen-printing method for use in IMR and injection molding is disclosed to include the steps of: (a) printing a layer of transparent hardening agent on a roll of PET material by means of an auto screen printing press and then drying the printing, (b) printing four different color mixtures of ink and hardening agent one after another on the dried transparent hardening agent and drying the four color mixtures respectively after each color printing, (c) screen-printing a layer of backing ink on the color mixtures of ink and hardening agent and then drying the layer of backing ink, and (d) setting the printed roll of PET material thus obtained in an injection-molding machine for injection-molding with a plastic material into the desired finished product.

8 Claims, 1 Drawing Sheet

FIG 1

AUTO SCREEN-PRINTING METHOD FOR USE IN IMR AND INJECTION-MOLDING

BACKGROUND OF THE INVENTION

1. Field of the Invention

The present invention relates to a printing technology and, more particularly, to an auto screen-printing method for IMR and injection molding application.

2. Description of the Related Art

Conventional IMR printing methods include transfer-printing, spray-painting, electroplating, and direct injection molding. The transfer-printing method is not economic because it requires a long warm-up time and causes a big loss during printing. Further, this method cannot show an outstanding metal coloring. The electroplating method is expensive and has limitations on colors. The direct injection molding method is the most popularly accepted printing method. However, this method can only print one specific color at every injection molding process, not practical for printing a multi-color design.

SUMMARY OF THE INVENTION

The present invention has been accomplished under the circumstances in view. It is one object of the present invention to provide an auto screen-printing method for use in IMR and injection molding, which eliminates the drawbacks of the prior art printing methods. It is another object of the present invention to provide an auto screen-printing method, which is practical for use in IMR and injection molding. It is another object of the present invention to provide an auto screen-printing method, which is practical for multi-color printing. According to the present invention, the auto screen-printing method for use in IMR and injection molding comprises the steps of: (a) printing a layer of transparent hardening agent on a roll of PET material by means of an auto screen printing press and then drying the printing, (b) printing four different color mixtures of ink and hardening agent one after another on the dried transparent hardening agent by means of an auto screen printing press and drying the four color mixtures respectively after each color printing, (c) printing a layer of backing ink on the color mixtures of ink and hardening agent by means of an auto screen printing press and then drying the layer of backing ink, and (d) setting the printed roll of PET material thus obtained in an injection-molding machine for injection-molding with a plastic material into the desired finished product.

DETAILED DESCRIPTION OF THE PREFERRED EMBODIMENT

Figure 1:
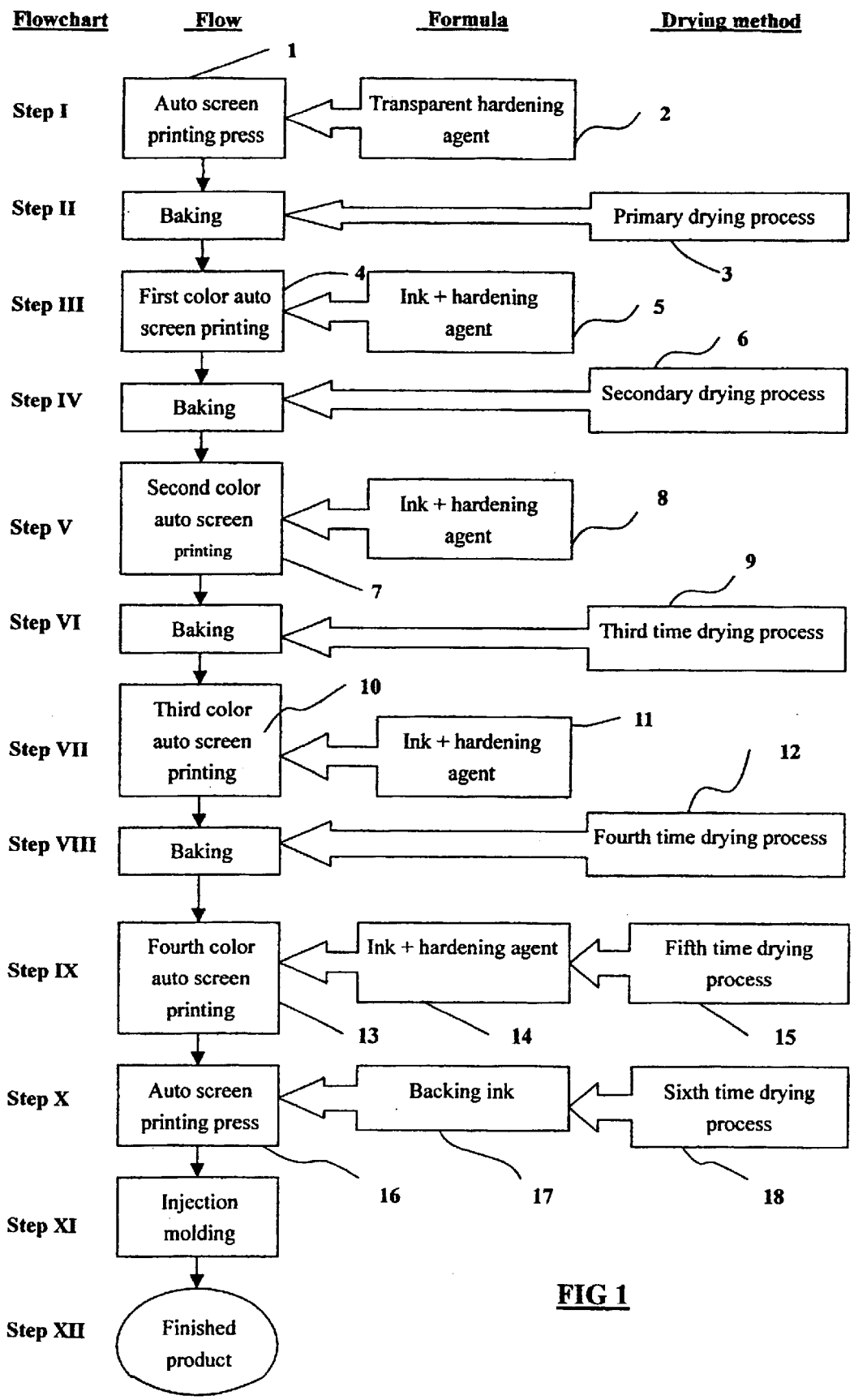
FIG. 1 is a block diagram explaining the operation flow of the auto screen-printing method according to the present invention.

Referring to FIG. 1, the invention comprises the steps of 1 through 12.

The first step is to print a layer of transparent hardening agent 2 on a roll of PET material by means of an auto screen printing press 1. The hardening agent 2 forms a layer of anti-scraping ink that protects the printing of the finished product against scraping.

The second step is the primary drying process 3 to dry the hardening agent 2 by baking at 80° C.~100° C. for 2~5 minutes.

The third step is the first color auto screen printing 4 to print a first color mixture of ink and hardening agent 5 on the dried hardening agent 2 by means of an auto screen printing press.

The fourth step is the secondary drying process 6 to dry the first color mixture of ink and hardening agent 5 by baking at 80° C.~100° C. for 2~5 minutes.

The fifth step is the second color auto screen printing 7 to print a second color mixture of ink and hardening agent 8 on the first color mixture of ink and hardening agent 5.

The sixth step is the third time drying process 9 to dry the second color mixture of ink and hardening agent 8 by baking at 80° C.~100° C. for 2~5 minutes.

The seventh step is the third color auto screen printing 10 to print a third color mixture of ink and hardening agent 11 on the second color mixture of ink and hardening agent 8.

The eighth step is the fourth time drying process 12 to dry the third color mixture of ink and hardening agent 11 by baking at 80° C.~100° C. for 2~5 minutes.

The ninth step is the fourth color auto screen printing 13 to print a layer of fourth color mixture of ink and hardening agent 14 on the third color mixture of ink and hardening agent 11 and then to dry the fourth color mixture of ink and hardening agent 14 through a fifth time drying process 15 by baking at 80° C.~100° C. for 2~5 minutes.

The tenth step is to print a layer of backing ink 17 on the layer of fourth color mixture of ink and hardening agent 14 by means of an auto screen printing press 16 and then to dry the layer of backing ink 17 through a sixth drying process 18 by baking at 80° C.~100° C. for 2~5 minutes. The backing ink 17 is to enhance the brightness of the printing face and the bonding power of the printing face to plastic material during a further injection molding process.

The eleventh step is to set the printed roll of PET material thus obtained in an injection-molding machine for injection molding with a plastic material into the desired finished product.

Further, in the aforesaid steps, the colors of the four color mixtures are assigned by the customs and, the content of the hardening agent used in each mixture is within about 2~8%.

A prototype of auto screen-printing method for use in IMR and injection-molding products has been constructed with the features of FIG. 1. The auto screen-printing method functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An auto screen-printing method for use in IMR and injection molding, comprising the steps of:
   (a) printing a layer of transparent hardening agent on a roll of PET material by means of an auto screen printing press and then drying the printing;
   (b) printing four different color mixtures of ink and hardening agent one after another on the dried transparent hardening agent by means of an auto screen printing press and drying the four color mixtures respectively after each color printing;
   (c) printing a layer of backing ink on said color mixtures of ink and hardening agent by means of an auto screen printing press and then drying the layer of backing ink; and (d) setting the printed roll of PET material thus obtained in an injection-molding machine for injection-molding with a plastic material into the desired finished product.

2. The auto screen-printing method as claimed in claim 1, wherein said transparent hardening agent forms a layer of anti-scraping ink.

3. The auto screen-printing method as claimed in claim 1, wherein the drying process in each of steps (a)~(c) is to dry by baking.

4. The auto screen-printing method as claimed in claim 1, wherein the drying process in each of steps (a)~(c) is to dry by baking at 80° C.~100° C.

5. The auto screen-printing method as claimed in claim 1, wherein the drying process in each of steps (a)~(c) is to dry by baking at 80° C.~100° C. for 2~5 minutes.

6. The auto screen-printing method as claimed in claim 1, wherein said step (b) printing four different color mixtures of ink and hardening agent is to print customer assigned four different color mixtures of ink and hardening agent one after another on the dried transparent hardening agent.

7. The auto screen-printing method as claimed in claim 1, wherein said backing ink is to enhance the brightness of the printing face and the bonding power of the printing face to the plastic material during injection molding.

8. The auto screen-printing method as claimed in claim 1, wherein the content of hardening agent used in each of said four different color mixtures is within about 2~8%.

* * * * *